March 17, 1925.
E. R. HOLMES
TUBE FRAME FOR AXMINSTER LOOMS
Filed June 22, 1923
1,529,789
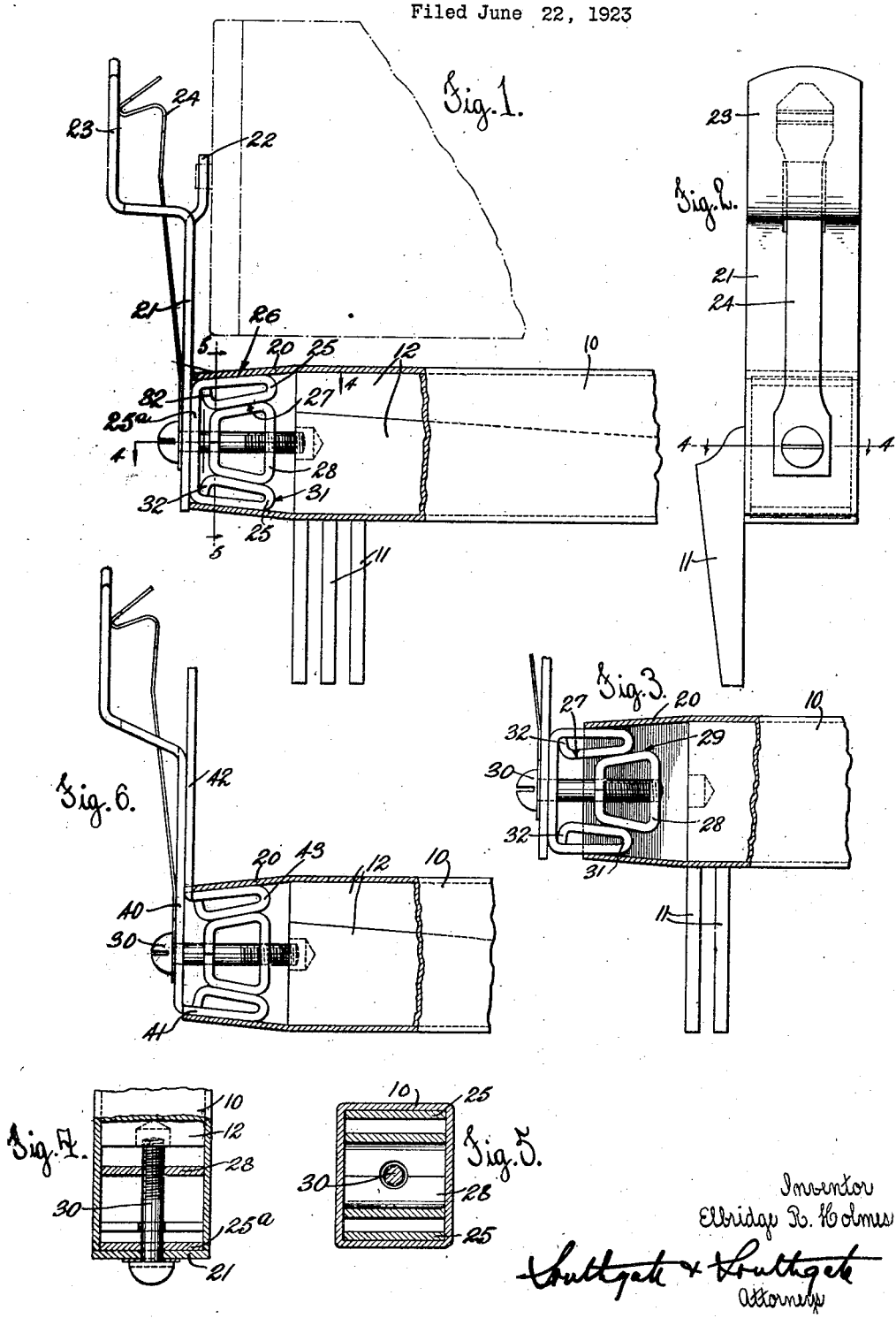
Inventor
Elbridge R. Holmes
Southgate & Southgate
Attorneys Patented Mar. 17, 1925.

1,529,789

UNITED STATES PATENT OFFICE.

ELBRIDGE R. HOLMES, OF WORCESTER, MASSACHUSETTS, ASSIGNOR TO CROMPTON & KNOWLES LOOM WORKS, A CORPORATION OF MASSACHUSETTS.

TUBE FRAME FOR AXMINSTER LOOMS.

Application filed June 22, 1923. Serial No. 647,159.

*To all whom it may concern:*

Be it known that I, ELBRIDGE R. HOLMES, a citizen of the United States, residing at Worcester, in the county of Worcester and State of Massachusetts, have invented a new and useful Tube Frame for Axminster Looms, of which the following is a specification.

This invention relates to improvements in tube frames for Axminster looms and more particularly to means for securing the supporting brackets to the body of the tube frame.

Tube frames used in Axminster looms for weaving wide rugs are usually constructed of a tubular bar into the ends of which extend arms carried by the supporting brackets. These arms are secured to the bar by means of a number of screws which pass thru the bar into the arms, but this construction is costly, and also, it is found that the several screws work loose, necessitating constant care and attention to keep the supporting brackets tightly secured in place on the tube frames.

The principal object of my invention is to overcome these defects by providing a single quickly attached screw which serves to hold the parts in place by drawing together coacting wedge surfaces on the bar and bracket.

Further objects of the invention relate to combinations and arrangements of parts which will appear hereinafter and be pointed out in the claims.

In the accompanying drawings, wherein two forms of the invention are shown,

Fig. 1 is a front elevation of one end of a tube frame having my invention applied thereto, parts being removed to show the invention more clearly, Fig. 2 is an end elevation of the structure shown in Fig. 1, Fig. 3 is a view similar to Fig. 1 but showing the manner of assembling the bracket and associated parts, Fig. 4 is a horizontal section on line 4—4 of Fig. 2, Fig. 5 is a vertical section on line 5—5 of Fig. 1, and Fig. 6 is a view similar to Fig. 1 but showing a modified form of the invention.

In carrying out my invention I provide the customary tubular bar or member 10 with yarn tubes 11 held thereto in any desired manner. If it is desired to stiffen the frame tapered wooden strips 12 may be driven therein, these strips terminating a short distance from the end of the tubular member to afford space for parts to be described.

In the form of the invention shown in Figs. 1—5 the end of the bar or tubular member 10 is tapered slightly as at 20 by having the top and bottom portions thereof bent toward each other as shown in Figs. 1 and 3. The spool supporting bracket 21 is formed with the usual spool bearing 22 and has offset therefrom chain engaging tongue 23 which engages the chain (not shown) usually found on the type of Axminster loom employing tube frames. Spring hook 24 may be provided to cooperate with the tongue 23 in supporting the tube frame on the chain.

Arms 25 extend from a plate 25$^a$ which is welded or otherwise fastened to the bracket 21. The arms have outer faces 26 which are inclined similarly to the inclined faces of the tapered parts 20. The arms are bent on themselves to provide inner faces 27 which are preferably at a greater inclination with respect to the axis of the tubular member than the inclination of faces 26.

Arranged to cooperate with faces 27 is a wedge or block 28 having faces 29 in contact with said faces 27 and so disposed as to force the arms 25 against the tapered parts 20 of the tubular member when moved toward the end of the frame. To effect this movement a screw 30 is passed through spring 24, bracket 21 and plate 25$^a$ and threaded into the block or wedge 28. The block is shown as bent up from a single piece of material, and having the ends thereof abutting the arms to give strength to the block, but I do not wish to be limited to this particular construction.

In assembling the parts, the block is moved along the screw and the arms 25 drawn together until they will enter the tubular member as shown in Fig. 3, the rounded ends 31 of the arms and the flexibility of the material from which plate 25$^a$ and the arms are formed facilitating this movement. The bracket is then pushed in place and the screw tightened until the arms 25 are forced against the tapered part of the tubular member, the bracket being thus held securely to the tube frame. It will be noted that the end of the tapered parts of the tubular member engage the bracket at points adjacent both arms 25 and the bracket is therefore limited in its inward motion. Also, it will be noted that the bent ends 31 of the arms 25 lie in contact with the arms and thus brace the faces 27 to prevent collapse of the same under influence of the wedge.

In the modified form of the invention shown in Fig. 6 the tubular member and wedging block are formed as in the preferred form, but the arms which extend into the tube frame, instead of being on a separate plate, are formed on the bracket and spool bearing, respectively. Accordingly, bracket 40 has arm 41 formed on the lower end thereof and spool bearing 42 has a similar arm 43 formed thereon, the arms 41 and 43 being similar to the arms 25 shown in the preferred form of the invention. The spool bearing 42 and bracket 40 are secured together as by welding or in any other manner. In other respects both forms of the invention are similar.

It will be seen that in both forms of the invention the wedge shaped block forces the arms against the tubular member to hold the bracket firmly in place and that the whole structure is held together by a single relatively large screw which can be readily released to remove a defective bracket.

Having described my invention it is apparent that changes and modifications can be made therein by those skilled in the art without departing from the spirit and scope of the invention as set forth in the appended claims and I do not wish to be otherwise limited to the details disclosed herein, but what I claim is:

1. In a tube frame for Axminster looms, a yarn tube carrying member, a supporting bracket therefor, coacting wedging portions formed on said member and bracket, and means to lock said coacting wedging portions together to prevent relative movement of the bracket with respect to the member.

2. In a tube frame for Axminster looms, a tubular yarn tube carrying member, a supporting bracket therefor, the tubular member having faces inclined with respect to each other, portions of said bracket having inclined faces in contact with the said inclined faces of the member, and means to hold the corresponding contacting inclined faces of the member and bracket together in locked relation to prevent relative movement of the bracket with respect to the member.

3. In a tube frame for Axminster looms, a tubular yarn tube carrying member, a supporting bracket therefor, the tubular member having interior faces inclined with respect to each other, arms on the bracket having inclined faces in contact with said inclined faces of the member, and means to hold the corresponding contacting inclined faces of the member and bracket together in locked relation to prevent relative movement of the bracket with respect to the member.

4. In a tube frame for Axminster looms, a tubular yarn tube carrying member, a supporting bracket therefor, a portion of the member being formed to have a cross section diminishing progressively toward the end of said member, and means carried by said bracket to engage the portion of the member with diminishing cross-section to lock said bracket to the member and prevent movement of said bracket with respect to said member.

5. In a tube frame for Axminster looms, a tubular yarn tube carrying member, a supporting bracket therefor, coacting wedging portions formed on said member and bracket, and means to lock said portions together in close contact with each other, said bracket being in locking engagement with said tubular member to hold said member and bracket against relative movement under influence of the wedging portions.

6. In a tube frame for Axminster looms, a tubular yarn tube carrying member, a supporting bracket therefor, a pair of arms on said bracket extending into said member, and a block located within the member and in engagement with the arms, said block being movable to force said arms against the member.

7. In a tube frame for Axminster looms, a tubular yarn tube carrying member having inclined faces, a supporting bracket therefor, arms carried by said bracket, a wedge, and means to move said wedge against said arms and move the latter against the inclined faces of the member.

8. In a tube frame for Axminster looms, a tubular yarn tube carrying member having inclined faces, a supporting bracket therefor, arms carried by the bracket and having inclined faces adjacent the inclined faces of the member, other inclined faces formed on said arms, a wedge to engage said other faces, and means to move said wedge against said other faces to force the arms against the member.

9. In a tube frame for Axminster looms, a tubular yarn tube carrying member having inclined faces, a supporting bracket therefor, arms rigid with said bracket and having faces substantially parallel to the inclined faces on said member, other faces on said arms inclined to the member at an angle greater than that of the inclined faces of said member, a wedge to engage said faces of greater inclination, and means to force said wedge against said latter faces of greater inclination.

10. In a tube frame for Axminster looms, a tubular yarn tube carrying member having inclined faces, a supporting bracket therefor, arms carried by the bracket having inclined faces, a wedge engaging said arms, a spring hook associated with the bracket, and a screw passing through said spring hook, bracket and wedge and serving to lock all said parts in fixed relation with respect to the tubular member.

11. In a tube frame for Axminster looms, a tubular yarn tube carrying member, a supporting bracket therefor, an arm extending along a portion of said member and carried by said bracket, said arm having a face inclined with respect to the tubular member, a block having a face inclined similarly to the inclined face of said arm, and means to force said block against said arm to hold the latter in locked relation with respect to the tubular member.

In testimony whereof I have hereunto affixed my signature.

ELBRIDGE R. HOLMES.